No. 793,739.                                                     Patented July 4, 1905.

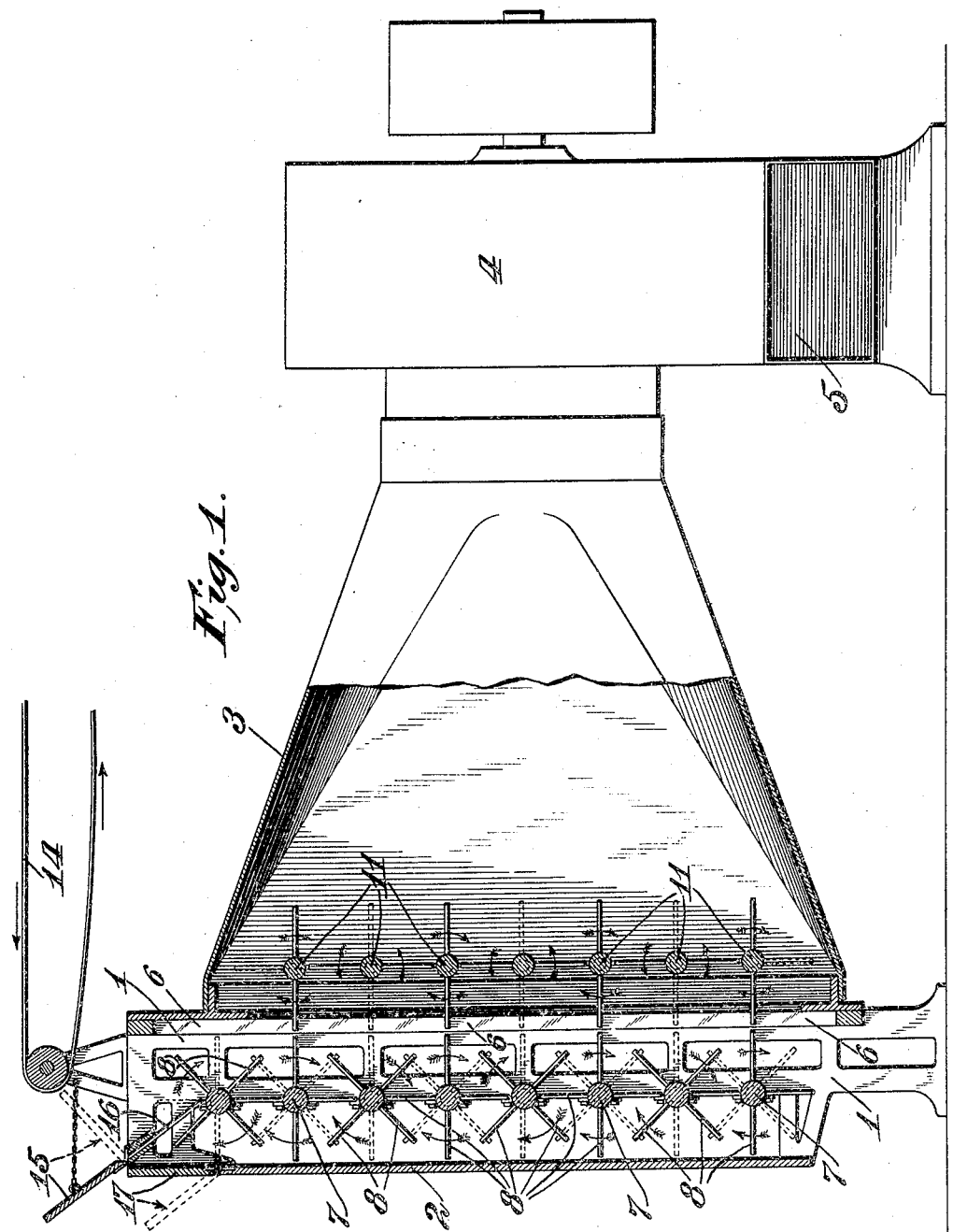

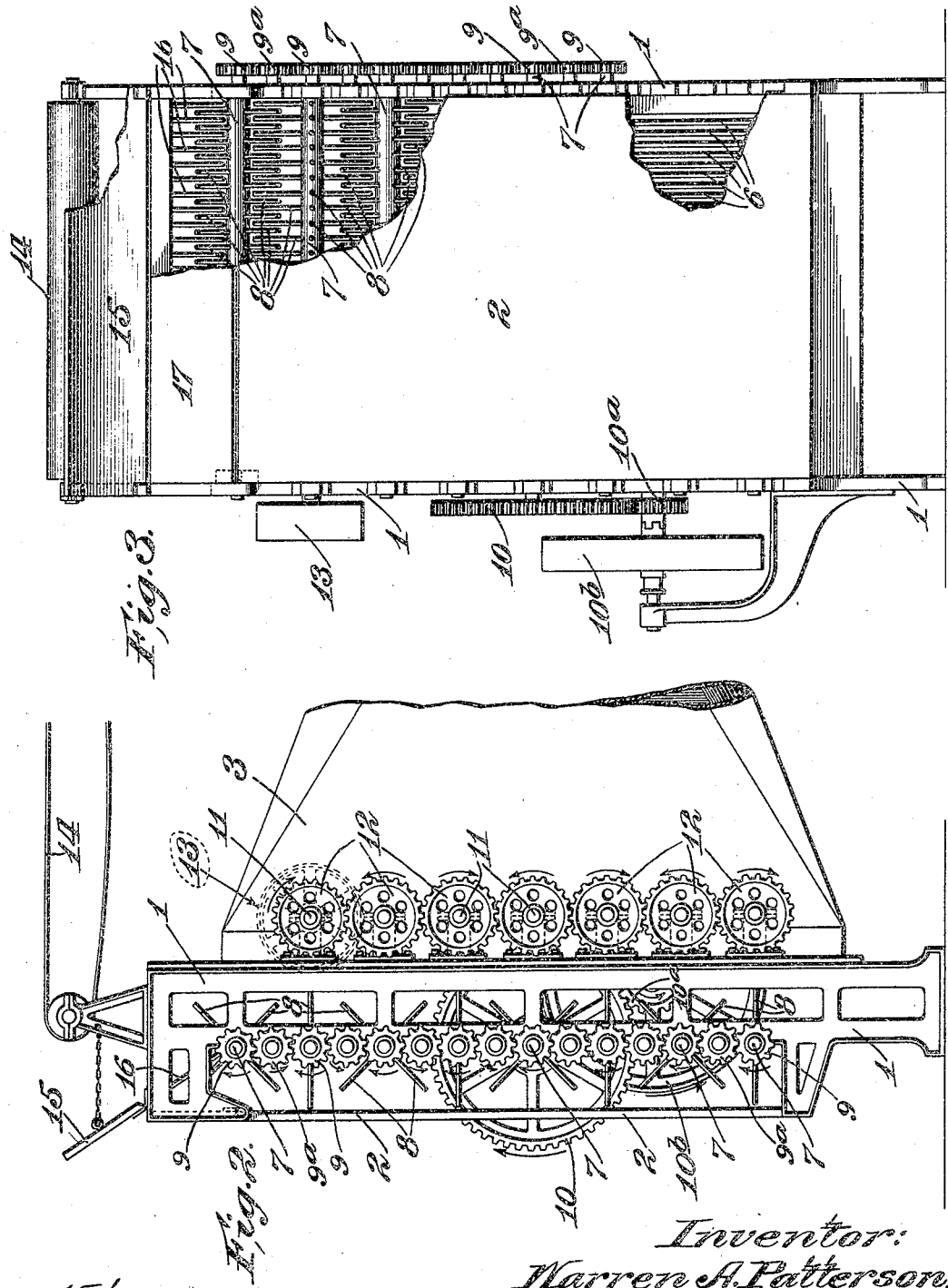

UNITED STATES PATENT OFFICE.

WARREN A. PATTERSON, OF ST. LOUIS, MISSOURI.

COTTON-SEPARATOR.

SPECIFICATION forming part of Letters Patent No. 793,739, dated July 4, 1905.

Application filed February 3, 1905. Serial No. 244,048.

*To all whom it may concern:*

Be it known that I, WARREN A. PATTERSON, a citizen of the United States, residing at St. Louis, Missouri, have invented a certain new and useful Improvement in Cotton-Separators, of which the following is a full, clear, and exact description, such as will enable others skilled in the art to which it appertains to make and use the same, reference being had to the accompanying drawings, forming part of this specification, in which—

Figure 1 is a sectional view of my improved cotton-separator. Fig. 2 is a side elevational view showing the driving mechanism, and Fig. 3 is a front elevational view, partly in section.

This invention relates to a new and useful improvement in cotton-separators for removing the cotton from the bolls after they are picked from the plant.

My present construction is designed as an improved apparatus for carrying out the method disclosed in an application for patent filed by me on October 15, 1904, Serial No. 228,577.

As generally practiced, the cotton is removed from the boll, leaving the boll on the plant. This has not only proven tedious, but it is not entirely successful, because the dry bolls frequently become broken and the parts are collected with the cotton and have to be subsequently removed by cleaning devices.

According to my invention the cotton is picked with the boll, and consequently there is no danger of any cotton being left in the field, as is frequently the case where the fibers adhere to the attached boll. These bolls are operated upon by my improved machine, which strips the cotton therefrom in a very effective manner.

With these objects in view the invention consists in the construction, arrangement, and combination of the several parts, all as will be hereinafter described, and afterward pointed out in the claims.

In the drawings, 1 indicates the side frames, which support the front wall 2, said front wall being preferably imperforate, while the side frames 1 are made up in skeleton form, so as to permit air to be drawn through the openings thereof.

3 indicates a collecting-funnel forming a suction-chamber, whose mouth embraces the operating devices of my improved separator, said funnel tapering to the eye of an exhaust-fan or blower 4, (see Fig. 1,) which blower is designed to draw the cotton from the separator and deliver it through the discharge-opening 5 into a suitable conduit or receptacle.

The active elements of my improved separator comprise two vertical series of rotating devices having picker-teeth which coöperate with vertical screen-bars 6, carried by the cross-pieces of the side frames 1.

7 represents the conveying or feeding cylinders constituting a vertical series arranged between the screen-bar 6 and the front wall 2. These cylinders are each provided with radial teeth 8, so arranged with relation to the teeth of the adjacent cylinder that they pass each other in their respective paths, as shown more clearly in Fig. 3.

The staggered relation of the teeth of adjacent cylinders insures the cotton being delivered from the teeth of one cylinder onto the teeth of an adjacent cylinder, which keeps the cotton and its bolls in a state of constant agitation and also provides a means for effectually cleaning the teeth of each cylinder, and this cleaning operation is mutual between the teeth of adjacent cylinders. The ends of the cylinders 7 are provided with gears 9, which mesh with intermediate idle gears $9^a$, whereby the cylinders are all driven in the same direction. A main driving-gear 10 is provided for communicating motion to the cylinder 7, which driving-gear receives its motion from a drive-pulley $10^b$, on the shaft of which is a pinion $10^a$.

It will be noted that each cylinder is provided with four rows of teeth which are staggered with relation to the teeth of adjacent cylinders, while with respect to the picker-cylinders 11 there are but two rows of teeth, and these are not staggered with relation to the teeth of adjacent cylinders, they traveling in the same paths between the screen-bars; that while the cylinders 7 all rotate in the same direction the picker-cylinders 11 rotate in opposite directions, and that where the teeth of the cylinders 7 do not pass between the screen-bars 6, but have their ends traveling in paths adjacent to said screen-bars, the teeth of the picker-cylinders 11 extend between the screen-bars 6.

Each picker-cylinder 11 is provided with a gear 12, (see Fig. 2,) which meshes with the gear 12 of the adjacent picker-cylinder, (there being no intermediate idle gear,) and a pulley 13 (see Fig. 2) constitutes a driving means for the series of gears 12.

By referring to Figs. 2 and 3 it will be observed that separate driving mechanisms are provided for the cylinders 7 and 11. In actual practice it is contemplated to rotate all of the cylinders 7 at the same speed, and while the picker-cylinders 11 are each rotated at the same speed it is contemplated to rotate them at a speed in excess of the speed of rotation of the cylinders 7, the difference in the speeds of rotation of the cylinders 7 and 11 being dependent upon the rate at which the pulleys $10^b$ and 13 are driven.

In order to supply the boll-cotton to my improved separator, I arrange a conveyer-belt 14, which delivers the cotton into the top of the machine.

15 indicates a hopper under which is arranged a comb 16, the teeth of this comb extending down to the uppermost cylinder 7 and between which the teeth of said cylinder pass.

If it is desired to preserve the integrity of the bolls, the parts are arranged as shown in full lines in Fig. 1, the bolls and the cotton being delivered onto the hopper 15, whence they fall onto the comb 16 and are lifted from the comb by the teeth 8 and delivered against the screen-bars 6. Here the suction tends to draw the cotton from the bolls, and as the picker-teeth revolve they catch the cotton in their paths and draw it into the funnel, where it is handled by the circulating air. The teeth of the picker-cylinders 11 travel alternately in directions opposite to each other and at a speed higher than the speed of the teeth 8 of the cylinder 7, so as to catch the cotton and deliver it into the funnel, as will be readily understood.

If it is desired to break up the boll before subjecting the same to the action of my improved apparatus, the hopper 15 is moved to the position shown in dotted lines in Fig. 1, and a hinged portion 17 of the front wall 2 is moved to the position shown by dotted lines in Fig. 1, where said hinged portion constitutes a hopper upon which the bolls and cotton are delivered. Passing from the hinged portion 17 onto the teeth of the upper cylinder 7, the bolls are caught between the teeth 8 and the under side of the comb 16, against which they are broken, the bolls being reduced by this operation to pieces small enough to pass between the teeth of the comb 16.

I am aware that changes in the construction, arrangement, and combination of the several parts of my device can be made and substituted for those herein shown and described without departing from the nature and principle of my invention.

Having thus described the invention, what is claimed as new, and desired to be secured by Letters Patent, is—

1. A cotton-separator comprising an imperforate front wall, perforated side walls, screen-bars, conveyer-cylinders on one side of said screen-bars, picker-cylinders on the opposite side of the said screen-bars, a conduit-pipe through which the cotton passes from the picker-cylinders, and means for creating suction in said conduit-pipe; substantially as described.

2. A cotton-separator comprising screen-bars, conveyer-cylinders arranged on one side of said screen-bars and all rotating in the same direction, and picker-cylinders arranged on the opposite side of said screen-bars and rotating in opposite directions; substantially as described.

3. A cotton-separator comprising screen-bars, conveyer-cylinders having teeth which operate adjacent to said screen-bars, and picker-cylinders whose teeth project between the screen-bars; substantially as described.

4. A cotton-separator comprising a screen consisting of bars, conveyer-cylinders provided with teeth arranged so that the zones of travel of the teeth on one cylinder overlap the zones of travel of the teeth on an adjacent cylinder, the said cylinders being arranged on one side of said screen-bars, and picker-cylinders having teeth, said picker-cylinders being arranged on the opposite side of said screen-bars; substantially as described.

5. A cotton-separator comprising screen-bars, of a series of low-speed conveyer-cylinders all rotating in the same direction, and adjacent to one face of the screen, and high-speed picker-cylinders rotating in opposite directions and coöperating with the opposite face of the screen; substantially as described.

6. A cotton-separator comprising side frames, conveyer-cylinders mounted in said side frames and provided with rows of staggered teeth whose paths of travel overlap the path of travel of the teeth of adjacent cylinders, means for rotating said cylinders in the same direction, screen-bars arranged to one side of the said cylinders but beyond the paths of travel of the teeth thereof, and picker-cylinders rotating in opposite directions and at higher speed than the conveyer-cylinders, said picker-cylinders having teeth whose paths of travel overlap the paths of travel of the teeth on an adjacent cylinder, said teeth protruding into the space between the screen-bars; substantially as described.

7. In an apparatus of the character described, the combination with a conveyer-belt, a hinged plate 15 constituting a hopper in one of its positions, a comb arranged beneath said plate, and a rotating cylinder whose teeth pass between the teeth of said comb; substantially as described.

8. In an apparatus of the character described, the combination with a conveyer-belt, of a hinged plate 15, a comb 16, a hinged plate 17, and revolving teeth passing between the teeth of the comb; substantially as described.

9. In an apparatus of the character described, the combination with a conveyer-belt, of a hinged plate 15, a comb, revolving teeth acting upon the cotton, said teeth passing between the teeth of the comb, means for holding the plate 15 in one position whereby the cotton is delivered on top of the comb, and a hinged plate 17 for delivering the cotton under the comb when the hinged plate 15 is moved to its other position; substantially as described.

10. In a cotton-separator, the combination with a cylinder having teeth, a comb having teeth projecting between the teeth of the said cylinder, a hinged plate 15 arranged above the comb to direct the cotton on top of said comb or to one side thereof, and a hinged plate 17 arranged beneath the plate 15 for delivering the cotton onto the teeth of the cylinder whereby the cotton is forced against the under side of the comb and between the teeth thereof; substantially as described.

11. In a machine for removing cotton from bolls, the combination with a screen, of means for inducing a current of air through said screen, devices for causing the bolls to traverse one face of the screen, and means for catching the cotton and drawing it from the boll, through the screen and in the direction of the air-current; substantially as described.

12. In a cotton-separator, the combination with a suction-chamber, of a screen at the inlet end thereof, means on one side of said screen for operating upon the bolls, and means on the opposite side of the screen and within the suction-chamber for operating upon the cotton; substantially as described.

In testimony whereof I hereunto affix my signature, in the presence of two witnesses, this 20th day of January, 1905.

WARREN A. PATTERSON.

Witnesses:
F. R. CORNWALL,
GEORGE BAKEWELL.